United States Patent

[11] 3,633,607

[72] Inventor Bruno H. Werra
 Waukesha, Wis.
[21] Appl. No. 52,608
[22] Filed July 6, 1970
[45] Patented Jan. 11, 1972
[73] Assignee Ladish Co.
 Cudahy, Wis.

[54] ASEPTIC VALVES
14 Claims, 7 Drawing Figs.
[52] U.S. Cl.................................................. 137/241,
 137/312
[51] Int. Cl................................................. F16k 41/00
[50] Field of Search........................................... 137/241,
 312; 21/94

[56] References Cited
UNITED STATES PATENTS
2,764,995 10/1956 Krupp.......................... 132/241

Primary Examiner—Harold W. Weakley
Attorney—Morsell & Morsell

ABSTRACT: There is a valve body with a detachable bonnet, the latter having a steam chamber thereon through which the valve stem extends so that a portion of the valve stem which is exposed to the atmosphere in certain positions, is sterilized by the steam chamber when the valve stem is reciprocated inwardly. There is an annular sealing gasket between the bonnet and the top of the valve body with a rubber ring around the gasket to form an annular steam chamber inwardly of the rubber ring. A clamping ring which acts on annular flanges of the bonnet and valve has a slot through which the steam nipple projects.

INVENTOR
BRUNO H. WERRA

BY
Morsell & Morsell
ATTORNEYS

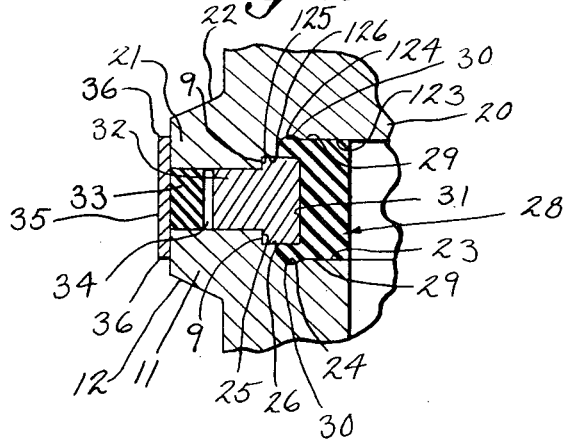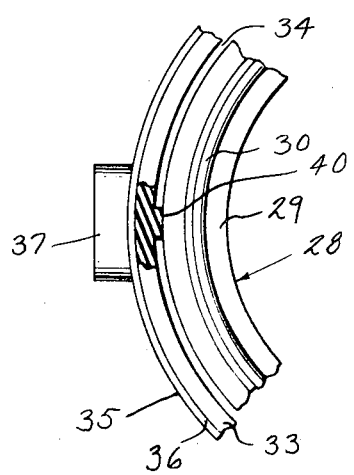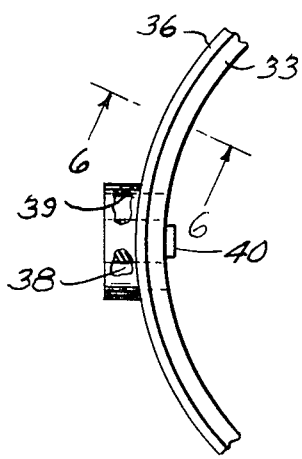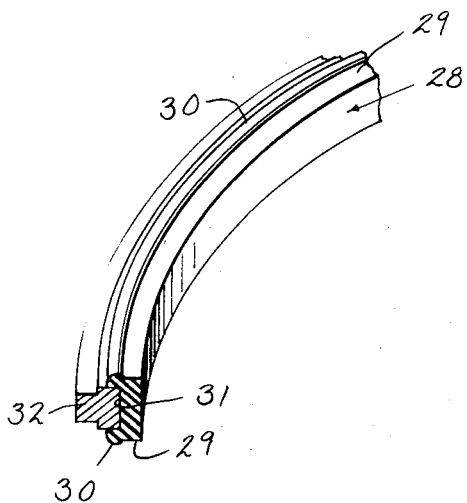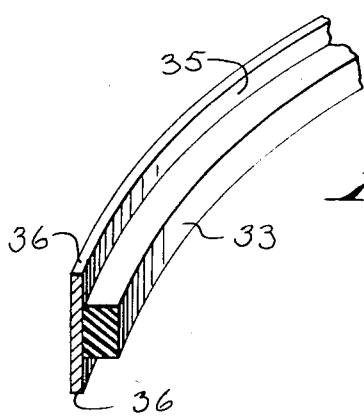

3,633,607

ASEPTIC VALVES

BACKGROUND OF THE INVENTION

1. Field of the Invention

The present invention is adapted for use in connection with conduits through which food is being pumped in liquid or semiliquid condition.

2. Description of the Prior Art

Heretofore when liquid food products are being pumped through a conduit under considerable pressure, some of the food material may bind its way through a joint between a valve bonnet and the valve body so that the food material within the valve chamber becomes contaminated by external bacteria. Conversely, should the conduit, for some reason, develop a vacuum condition, external bacteria could migrate through the pipeline joint and contaminate the food product in the conduit. Likewise, where there is a reciprocating valve stem having a portion which is exposed to the atmosphere in certain positions, the stem may carry bacteria from the atmosphere into the valve chamber when the valve stem is reciprocated inwardly, resulting in contamination of the food material.

SUMMARY OF THE INVENTION

In the preferred embodiment of the present invention a cup-shaped valve body has an externally projecting annular flange at its upper end on which the base of the valve bonnet is seated to close the valve chamber. There is an annular sealing gasket between the bonnet base and the valve body flange and a rubber ring outwardly of the gasket, forming an annular steam chamber between the rubber ring and gasket, and there being means providing for the circulation of steam throughout the length of the steam chamber around the gasket. A clamping ring removably secures the bonnet to the valve body flange and maintains the gasket and ring in position. There is a steam chamber on top of the bonnet through which the valve stem extends so that a portion of the valve stem which is exposed to the atmosphere in certain positions is sterilized by steam when the valve stem is reciprocated inwardly.

An object of the invention is to provide, in a sanitary valve having a joint between the top of the valve body and the base of a removable valve bonnet, an annular chamber for an aseptic medium in said joint which is so located that bacteria entering from the outside will be sterilized before they can come in contact with the food product within the valve chamber.

A further object of the invention is to provide means for sterilizing that portion of the valve stem which is exposed to the atmosphere in certain positions, whereby said portion of the stem will be sterilized before it is reciprocated inwardly to contact food material within the valve chamber.

A further object of the invention is to provide an aseptic valve in which the parts may be quickly disassembled for separate cleaning or replacement, and in which the parts are easily reassembled.

A further object of the invention is to provide as aseptic valve which is relatively simple in construction and otherwise well adapted for the purpose described.

With the above and other objects in view, the invention consists of the improved aseptic valve, and all of its parts and combinations, as set forth in the claims, and all equivalents thereof.

BRIEF DESCRIPTION OF THE DRAWING

In the accompanying drawings illustrating one complete embodiment of the preferred form of the invention, in which the same reference numerals designate the same parts in all of the views:

FIG. 2 is a fragmentary sectional view showing details of the joint between the bonnet base and the top of the valve body;

FIG. 3 is a fragmentary top view looking down on the top of the valve body with the sealing gasket and rubber ring in position, taken approximately on the line 3—3 of FIG. 1;

FIG. 4 is a plan view of a portion of the rubber ring and attached metal backing ring showing the steam inlet and outlet nipple;

FIG. 5 is a fragmentary perspective view of the inner gasket with its metal ring;

FIG. 6 is a fragmentary perspective view of the ring of FIG. 4, the forward end of FIG. 6 being a sectional view taken approximately on the line 6—6 of FIG. 4.

DESCRIPTION OF THE PREFERRED EMBODIMENT

Figure 1:
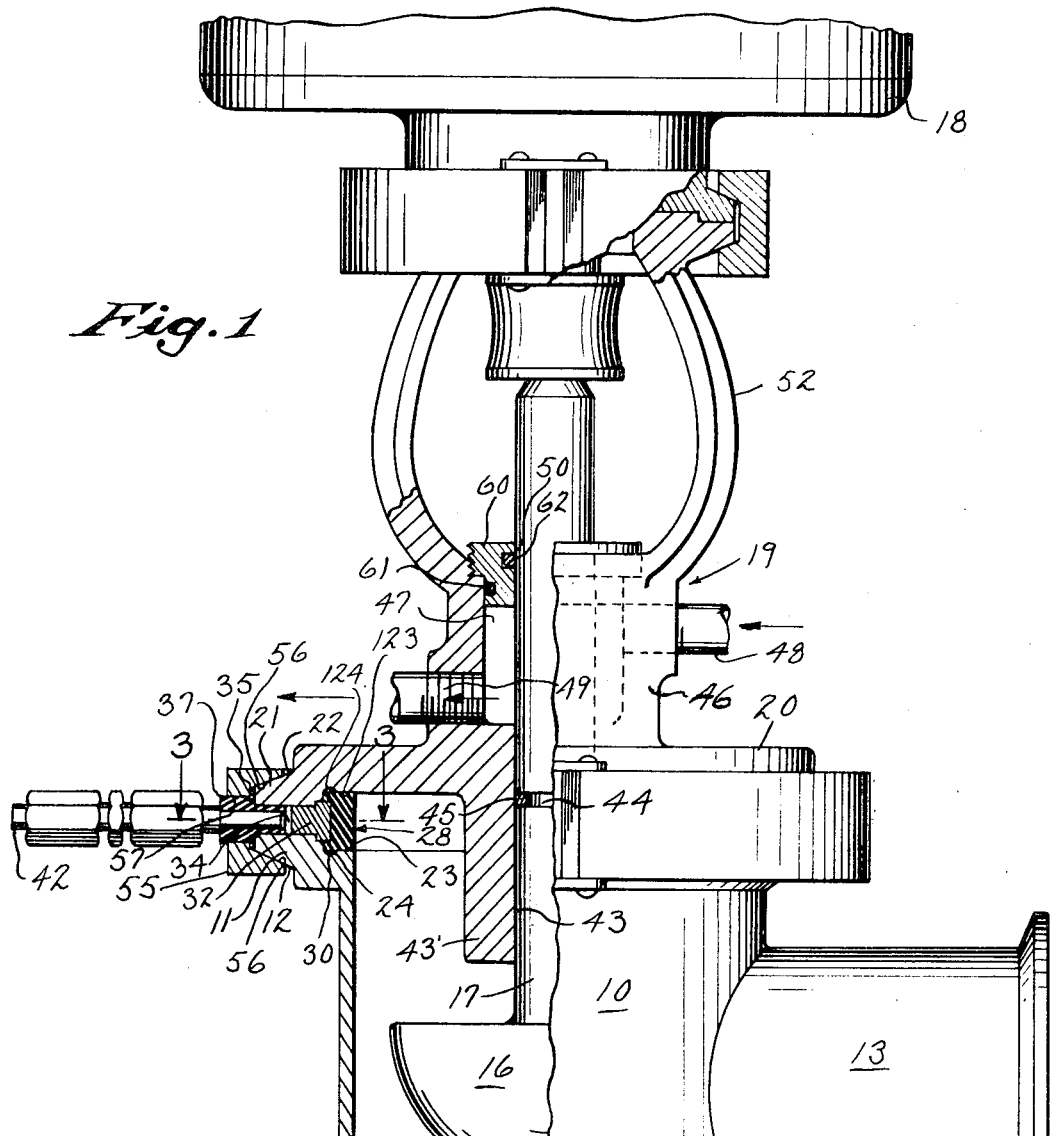
FIG. 1 is a front elevational view of the valve, parts being broken away and shown in vertical section.

Referring more particularly to the drawing, the valve has a cup-shaped body 10 with its upper end flanged outwardly as at 11, the lower surface of the annular flange being tapered upwardly as at 12. The valve body may have an outlet conduit 13 projecting from a side thereof with an inlet conduit 14 projecting from its lower end, there being an annular valve seat 15 which is adapted to be removable closed by a valve member 16 mounted on the lower end of a valve stem 17. The latter is adapted to be reciprocated by a suitable actuator 18, but the valve can obviously be operated by hand as far as the present invention is concerned.

Removable mounted on top of the valve body is a bonnet 19 having a base 20 with a portion 21 near the periphery of a diameter to coact with the annular flange 11 at the top of the valve body and to fit thereon to form a cover. The top of the bonnet base has an upper annular face near the periphery which is tapered downwardly as at 22.

Referring now to FIG. 2, the end face of the valve body flange 11 has an annular undercut to provide an annular recessed portion 23 communicating with an annular groove 24 which is arcuate in cross section. Outwardly of the annular groove 24 is a stepped portion 26 providing an annular alignment shoulder 25. The end face of the underside of the peripheral portion 21 of the bonnet base has like annular portions 123, 124, 125 and 126 which are opposed in position.

Adapted to be received in the recessed portions 23, 24, and 123 and 124 is an inner gasket 28 of rubber or rubberlike material having end faces 29 with circular beads 30. This gasket is of sufficient width to hold the faces 11 and 21 a substantial distance apart. The outer periphery of the gasket 28 has an annular recess 31 receiving part of a metal alignment ring 32, the gasket 29 being bonded to the ring. The metal alignment ring is T-shaped in cross section to provide annular shoulders 9 which seat against the shoulders 25 and 125 of FIG. 2 to align the flange 11 of the valve body with the portion 21 of the bonnet base. The outer peripheral portion of the alignment ring serves to space the end faces of the valve body flange 11 and bonnet base portion 21 apart, as shown in FIG. 2. The beads 30 of the gasket 28 are received in the arcuate grooves 24-124, and the portion of the gasket inwardly therefrom is received in the annular recess portions 23-123.

Between the opposed faces of the flange 11 of the valve body and the portion 21 of the bonnet base and outwardly of the metal alignment ring 32 is a ring 33 of rubber, rubberlike or other flexible material. Between the inner periphery of the metal alignment ring 33 and the outer periphery of the metal alignment ring 32 is an annular space 34. The outer periphery of the ring 33 is bonded to a flat metal ring 35 which has edge portions 36 projecting beyond the ring 33. Referring again to FIg. 2, when the ring 33 is in assembled position the annular space 34 forms an annular steam chamber, the rubber ring having a nipple 37 which projects radially outwardly through a suitable slot in the metal ring 35. This nipple has a steam inlet port 38 and a steam ou*l*·t port 39, both of which communicate with the steam chambe 34. The rubber ring has a dam 40 which projects inwardly farther than the rest of the rubber ring, as shown in FIG. 4, and which seats against the outer periphery of metal alignment ring 32 of gasket 28. This dam is located between the steam inlet 38 and steam outlet 39 to cause the entering steam to circulate around the ring before it exits from the steam outlet. The steam inlet conduit 38 may be coupled to a suitable source of steam by a pipe 42 (FIG. 1), and there may be a suitable discharge conduit for the steam from the outlet 39. A detachable clamping ring 55, having tapered faces 56 which coact with the tapers 12 and 22, is adapted to clamp the bonnet on the valve body as shown in FIg. 1. The clamping ring has a slot 57 through which the nipple 37 projects.

The valve stem 17 reciprocates through a central bore 43 in a boss 43' which depends from the base of the valve bonnet, there being a suitable O-ring seal such as the O-ring 45 in the groove 44 of the valve stem. Above the bonnet base 20 is a steam chamber housing 46 having a steam chamber 47 therein which surrounds a portion of the valve stem. Steam may enter the steam chamber 47 through an inlet passageway 48 and may exit from an outlet 49, as shown in FIG. 1. At the top of the housing 46 is a bushing 60 which is fitted with O-rings 61 and 62, the bushing having a valve stem bore 50 through which the upper end of the valve stem 17 projects.

Figure 7:
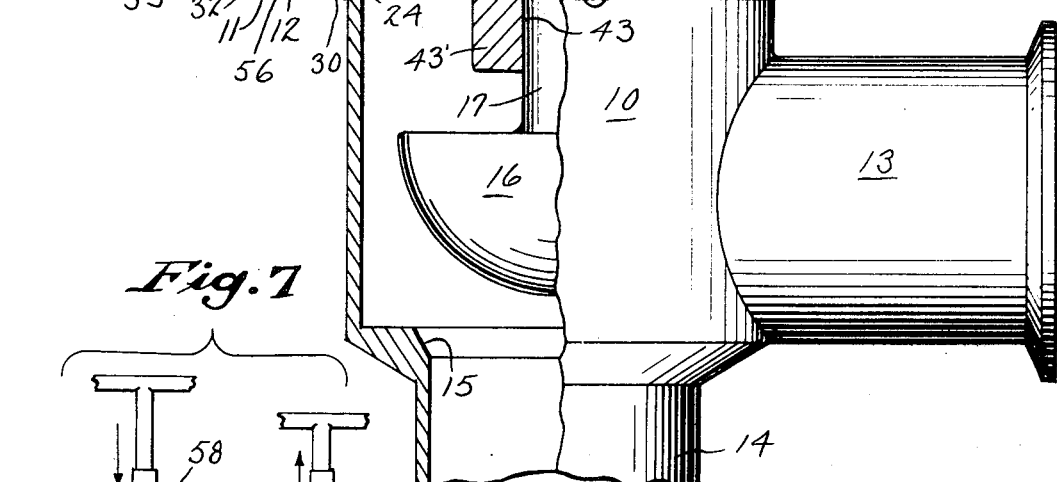
FIG. 7 is a diagrammatic view showing the steam connections.

Steam from any suitable source may enter a header 58 (FIG. 7), which header has a conduit leading to the inlet 48 for the bonnet steam chamber and has another conduit leading to the inlet port 38 of FIG. 4. The return steam from the bonnet chamber leaves by way of the conduit 49 and enters a return header 59 (FIG. 7). The return steam from the port 39 of FIG. 4 also returns to the header 59.

USE OF THE VALVE

In use, steam is kept circulating into and out of the joint between the bonnet and valve body while food is being pumped through the system at the relatively high pressure commonly used in this type of equipment. Heretofore, because of the pressure from the pump there was always the possibility of some of the food material working through the joint of FIG. 2 and getting contaminated by bacteria from the exterior, which bacteria could then work their way back into the valve by way of the escaping food product. Conversely, should the valve for some reason develop a vacuum condition, external bacteria could migrate through the joint of FIG. 2 and contaminate the food product in the valve. With the present invention any bacteria which might enter the joint from the outside would be sterilized by steam in the chamber 34 or by steam which has forced its way between the outer sides of the rubber ring 23 and the metal faces of the valve body flange and bonnet base. The inner periphery of the rubber ring 33 is spaced outwardly from the face of metal alignment ring 32 of gasket 28 except at the dam 40 of FIG. 3 so that steam can sterilize all of these surfaces. Thus any bacteria which might enter from the exterior will be contacted by steam and sterilized before said bacteria can work through the joint to the interior of the valve chamber.

When the valve is open there will be a portion of the valve stem 17 which is located within the bonnet spider 52 which will be exposed to the exterior. When the valve is closed this same portion of the stem will be moved inwardly. With the present invention, however, during closing of the valve any bacteria which is on a previously exposed portion of the valve stem will be thoroughly sterilized in the steam chamber 47. It is thus apparent that a valve construction has been provided which is capable of maintaining bacteria-free conditions.

Where steam is used as the aseptic medium it is preferably at a temperature of 212° F. or above. It is to be understood, however, that other aseptic mediums besides steam may be employed within the scope of the present invention. For example, chloride, iodine, or other aseptic medium in liquid or gaseous form may be delivered from the header 58 of FIG. 7 into the aseptic chambers 34 and 47 of FIG 2.

In the claims, the term "aseptic medium" contemplates any suitable medium which is capable of performing the desired sterilization and which can be circulated in the chamber described, and the term "aseptic chamber" contemplates a chamber containing any such medium.

It is to be understood that I do not desire to be limited to the exact details of construction shown and described, for obvious modifications will occur to a person skilled in the art.

What I claim is:

1. In a valve having a cup-shaped body with an annular connection flange, said flange having an end face, and said valve having a bonnet formed with a base, with said base having an annular end face portion near its periphery seated over the end face of said annular flange of the valve body, an inner ring-shaped gasket between said end face of the flange and the annular end face portion of the bonnet base, said end faces having opposed recessed portions shaped to receive said gasket, outer ring-shaped means outwardly of the gasket and between said end faces forming an annular chamber for an aseptic medium between said end faces, said chamber being so located that bacteria entering from the exterior are sterilized by the aseptic medium before they can pass the gasket to enter the interior of the valve body, and means for detachably clamping the bonnet base on said valve body flange.

2. A valve as claimed in claim 1 in which annular portions of said end faces which are outward of said recessed portions are spaced apart, and in which the outer ring-shaped means is located between said spaced-apart end face portions and comprises a flexible ring, the aseptic chamber being located inwardly of the inner diameter of said flexible ring.

3. A valve as claimed in claim 2 in which the outside diameter of the flexible ring is bonded to a wider metal band having annular portions on each side of the flexible ring which seat against the outer peripheries of the valve body flange and bonnet base.

4. A valve as claimed in claim 2 in which the flexible ring has an outwardly projecting nipple having inlet and outlet passageways for an aseptic medium.

5. A valve as claimed in claim 4 in which the metal band has a slot through which the nipple projects.

7. A valve as claimed in claim 2 in which the outer periphery of the inner ring-shaped gasket has an annular recess and in which there is a metal alignment ring with a portion seated in said recess and with a portion projecting outwardly therefrom, said portion which projects outwardly serving to maintain the spacing between the end face portions of the valve body flange and bonnet, and there being cooperating shoulder means on said last-mentioned end face portions and on the metal alignment ring for aligning the bonnet with the valve body.

6. A value as claimed in claim 4 in which the means for detachably clamping the bonnet base on the valve body flange is a clamping ring, and in which said clamping ring has a slot through which said nipple of the flexible ring projects.

8. A valve as claimed in claim 1 in which the opposed end faces of the flange and bonnet base have circular grooves communicating with said gasket-receiving recessed portions, and in which the inner gasket has circular beads of such size and so positioned as to fit within the grooves while maintaining the internal diameter of the gasket flush with the internal diameter of the valve body.

9. A valve as claimed in claim 1 in which there is a dam across the annular aseptic chamber, and in which the means for circulating an aseptic medium through the aseptic chamber includes an inlet communicating with the chamber on one side of the dam and an outlet communicating with the chamber on the other side of the dam.

10. In a valve having a cup-shaped body with an annular connection flange, said flange having an end face, and said valve having a bonnet formed with a base, with said base having an annular end face portion near its periphery seated over the end face of said annular flange of the valve body, ring-shaped gasket means between said end face portions, said gasket means including an annular aseptic chamber, means for circulating an aseptic medium through said chamber, said chamber being so positioned that bacteria entering between said end faces from the exterior are sterilized by an aseptic medium before they can enter the interior of the valve body, and means for detachably maintaining said annular connection flange and bonnet base in assembled condition.

11. A valve as claimed in claim 10 in which the bonnet base has a bore and has a tubular housing part aligned with said bore, with said bonnet base and housing part being of one-piece construction, in which there is a valve stem with a portion projecting slideably through the bore of the bonnet and through the housing, with the latter forming a chamber surrounding a portion of the valve stem, in which there is an aseptic medium in said chamber whereby portions of the valve stem which are exposed to the atmosphere in certain positions will be sterilized when the valve stem is pushed inwardly, and in which there is sealing means movable with the valve stem and located inwardly of said chamber for effecting a seal between the bonnet bore and stem.

12. A valve as claimed in claim 11 in which the aseptic chamber surrounding the valve stem is of relatively large radial and axial dimension to provide a large volume for asepticizing medium relative to the mass of adjacent metal of the housing and valve stem.

13. A valve as claimed in claim 11 in which the gasket means which is at the joint between the bonnet base and valve body includes an annular compressible portion inwardly of the annular chamber for the aseptic medium adjacent the interior of the valve body.

14. A valve as claimed in claim 11 in which the tubular housing part which forms a chamber for an aseptic medium around the valve stem projects outwardly from the cover, and in which the cover also has an integral boss projecting into the valve body through which the bore of the bonnet base extends and through which the valve stem slides, and in which the sealing means which is movable with the valve stem is between the valve stem and boss.

* * * * *